(12) United States Patent
Gonzales et al.

(10) Patent No.: US 9,361,264 B2
(45) Date of Patent: Jun. 7, 2016

(54) SYSTEMS AND METHODS FOR ACCESS AND CONTROL OF HARDWARE DEVICE RESOURCES USING DEVICE-INDEPENDENT ACCESS INTERFACES

(75) Inventors: Cesar A. Gonzales, Katonah, NY (US); Krishna Ratakonda, Yorktown Heights, NY (US); Deepak S. Turaga, Nanuet, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1151 days.

(21) Appl. No.: 11/872,515

(22) Filed: Oct. 15, 2007

(65) Prior Publication Data

US 2009/0100178 A1    Apr. 16, 2009

(51) Int. Cl.
G06F 15/16      (2006.01)
G06F 15/173     (2006.01)
G06F 9/50       (2006.01)

(52) U.S. Cl.
CPC ............... *G06F 15/173* (2013.01); *G06F 9/50* (2013.01)

(58) Field of Classification Search
CPC .................................................... G06F 15/173
USPC ........................................................ 709/226
See application file for complete search history.

(56) References Cited

U.S. PATENT DOCUMENTS

| | | | |
|---|---|---|---|
| 6,971,044 B2* | 11/2005 | Geng et al. ...................... | 714/11 |
| 7,310,344 B1* | 12/2007 | Sue ................................ | 370/410 |
| 7,454,785 B2* | 11/2008 | Kerstens et al. ................ | 726/12 |
| 7,478,152 B2* | 1/2009 | Holt et al. ...................... | 709/223 |
| 7,697,548 B2* | 4/2010 | Chang et al. ................... | 370/400 |
| 7,769,862 B2* | 8/2010 | Singh et al. .................... | 709/226 |
| 2004/0199635 A1* | 10/2004 | Ta et al. ......................... | 709/226 |
| 2005/0038878 A1* | 2/2005 | McGee et al. ................. | 709/220 |
| 2005/0060202 A1* | 3/2005 | Taylor et al. ...................... | 705/2 |
| 2007/0233809 A1* | 10/2007 | Brownell et al. .............. | 709/218 |
| 2008/0313318 A1* | 12/2008 | Vermeulen et al. ............ | 709/223 |
| 2009/0100178 A1* | 4/2009 | Gonzales et al. .............. | 709/226 |
| 2011/0138060 A1* | 6/2011 | Purkayastha et al. .......... | 709/227 |

\* cited by examiner

*Primary Examiner* — Christopher Biagini
*Assistant Examiner* — Keyvan Emdadi
(74) *Attorney, Agent, or Firm* — F. Chau & Associates, LLC (57) ABSTRACT

Systems and methods are provided that enable seamless access and control of hardware device resources through a common, device-independent interface without the need for device-specific drivers. For instance, system and methods are designed to expose capabilities/functions of hardware devices as web-based services which can be invoked to provide specific services based on the capabilities of the hardware devices.

19 Claims, 4 Drawing Sheets

SYSTEMS AND METHODS FOR ACCESS AND CONTROL OF HARDWARE DEVICE RESOURCES USING DEVICE-INDEPENDENT ACCESS INTERFACES

TECHNICAL FIELD OF THE INVENTION

The present invention relates generally to systems and methods for providing seamless access and control of hardware device resources through a common, device-independent interface without the need for device-specific drivers and, in particular, systems and methods for exposing functions of hardware devices as Web-based Services that can be accessed for specific services based on the capabilities of the hardware devices.

BACKGROUND

Technological innovations and developments in distributed computing systems and applications has led to a significant increase in the amount and variety of network computing devices and peripheral (hardware) devices that may be interconnected and remotely accessible over communications networks such as the Internet, corporate intranets, wireless networks (e.g., Bluetooth), small home or office networks, etc. Such network accessible peripheral devices may include, for example, printers, cameras, video/audio conferencing end points, cell phones, and other handheld computing devices. Typically, computing devices are designed to be "web ready" for network applications in that the devices are capable of receiving/transmitting control/data messages once connected to a shared communications network. However, in order for a client device/application to access functionalities of network accessible peripheral devices, a "device driver" typically must be installed or be present on the client device.

Drivers are essentially hardware-dependent, operating-system specific programs that are executed on the client to provide an interface to functions of the network hardware devices. For example, installing a driver for a network printer enables an end user to print documents, select printing options such as duplex printing, page collation, etc., and check printer queue and availability. Although certain types of hardware devices may perform functionally similar tasks (e.g., printers for printing), such devices can have completely different interfaces, requiring the user to install different drivers to communicate with each device. Indeed, even physical devices of the same brand and model may require different device drivers. As the number of network accessible peripherals increases, it can be burdensome for a user to install multiple different drivers in his/her client device (e.g., laptop) so as to communicate with each of a wide range of network accessible peripheral hardware devices. Moreover, when an individual connects to a shared communications network using a laptop computer (or other portable computing device) at a new location, the individual may not have access to the device drivers (e.g., printer driver) that are needed to communicate with the network hardware devices or resources available at that location.

SUMMARY OF THE INVENTION

Exemplary embodiments of the invention generally include systems and methods that enable seamless access and control of hardware device resources through a common, device-independent interface without the need for device-specific drivers. Exemplary embodiments of the invention include system and methods for exposing capabilites/functions of hardware devices as web-based services which can be invoked to provide specific services based on the capabilities of the hardware devices.

More specifically, in one exemplary embodiment of the invention, a computing system includes a network comprising a plurality of network nodes including one or more device nodes and computer nodes, a network hardware device located at each device node over the network, and a web services platform hosted by one or more computer nodes over the network. The web services platform allows access and control of the hardware devices over the network through common, device-independent interfaces that expose capabilities of the network hardware devices as web services that can be invoked to perform a service. The capabilities of the network hardware devices can be invoked to provide a specific task (atomic service) or as part of a composite web service workflow incorporating control of the network devices.

In one exemplary embodiment, the web services platform implements each common, device-independent interface to access and control a set of heterogeneous hardware devices that are associated with a class of network devices having a varied set of capabilities and interfaces but which perform a similar common function. For example, the common, device-independent interfaces may be implemented sing web service device adaptors that expose the capabilities of classes of network devices based on a common functionality, wherein each web service device adaptor exposes a common interface to a set of heterogeneous network hardware devices which perform a same common function, but which have diverse capabilities and interfaces associated with the common function.

In response to a client request for a given service, the web services platform uses the common device-independent interfaces to seamlessly identify one or more available network devices that support one or more capabilities needed to perform the requested service, and control the one or more identified network devices to perform the requested service. In addition, the common device-independent interface can be used to seamlessly negotiate available capabilities of one or more of the identified network devices to perform the requested service and select one or more of the identified network devices having available capabilities to perform the client requested service. The web services platform can establish a direct network connection between the requesting client and one or more of the identified network hardware devices.

These and other aspects, features, and advantages of the present invention will become apparent from the following detailed description of the preferred embodiments, which is to be read in connection with the accompanying drawings.

DETAILED DESCRIPTION OF EXEMPLARY EMBODIMENTS

Systems and methods providing seamless access and control of hardware device resources through platform/device-independent web services interfaces without the need for device-specific drivers will now be discussed in further detail with reference to FIGS. 1~4. For purposes of illustration, exemplary embodiments for accessing and controlling network hardware devices through web services will be discussed with regard to the use of web service adaptor technologies to access and control network hardware devices as web services. In general, web services adapters are used to build a common interface through which a client application can access/control networked hardware devices from various vendors (which perform functionally similar tasks) to provide specific services without the need for installing vendor specific drivers on the client. The use of web service adaptor technology allows the integration of hardware device with legacy, proprietary interfaces, as web services without requiring changes to the hardware device interfaces.

Figure 1:
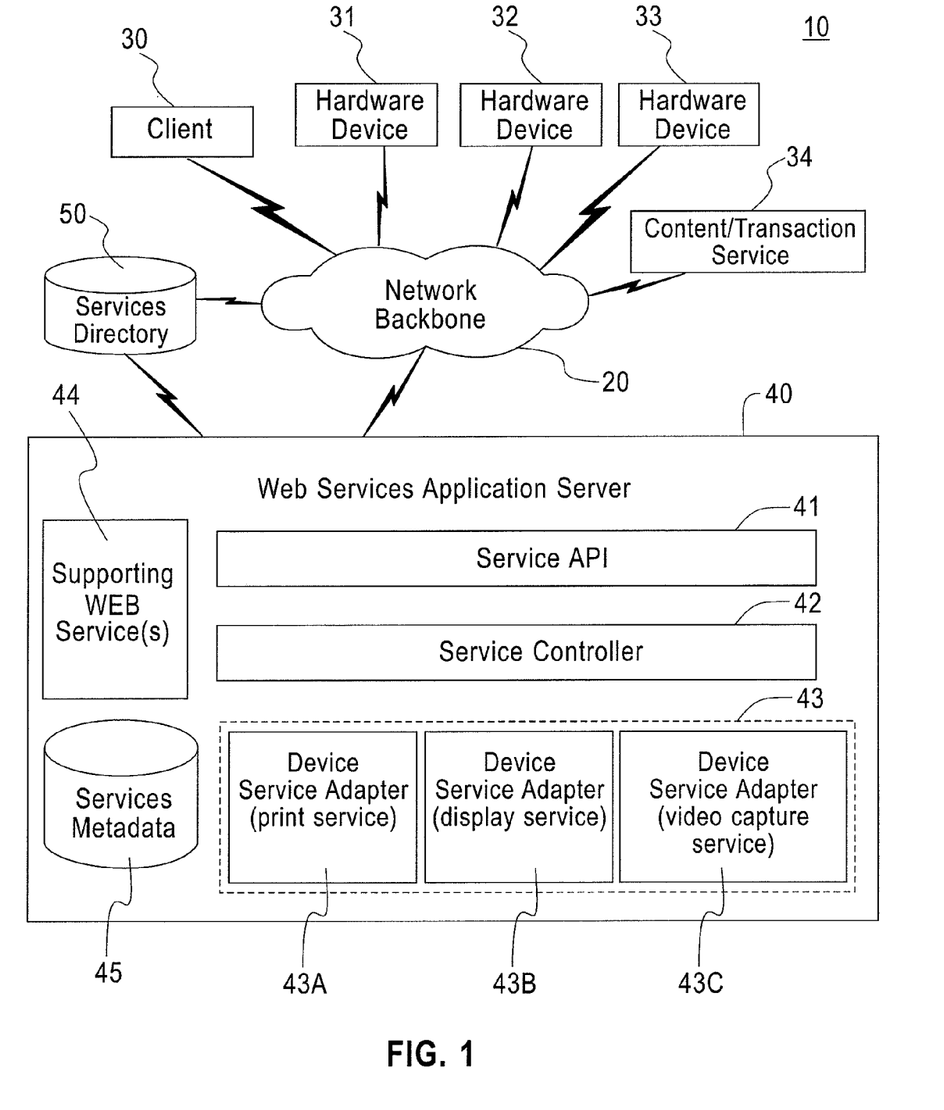
FIG. 1 is a block diagram of a distributed computing system in which networked hardware devices are controlled and accessed as web services according to an exemplary embodiment of the invention.

FIG. 1 is a block diagram of a computing system in which hardware devices can be accessed and controlled through a web-based services platform to provide services based on the capabilities of hardware devices, according to an exemplary embodiment of the invention. The system (10) comprises a communications network (20) and a plurality of network nodes including a client node (30), hardware device nodes (31~33), a content/transaction server node (34), one or more network server nodes that host a web-based services platform (40), and one or more server nodes that host web-based services directory (50). The communications network (20) may be a local or wide area network, a corporate intranet, a wireless network (e.g., Bluetooth wireless network), a global communications network (e.g., the Internet), etc., or any combination thereof. The client node (30) may be any type of computing device (hardware/software device) such as a laptop computer, desktop computer, portable handheld device (e.g., PDS, mobile phone, etc.) which execute one or more software applications. The hardware device nodes (31~33) may be one or more of various types of hardware devices (or peripherals) such as network printers, network display devices, data storage devices, fax machines, copy machines, video/audio conference end points, cameras, etc. The server node (34) may be any type of server machine that executes a server application to support content delivery (media content, news, data archival, etc.) or support e-transactions, etc.

The web services platform (40) comprises functional modules including, for example, an API (application programming interface) (41), a services controller (42), a plurality of device adapters (43), web service programs (44) and a service metadata repository (45). The web service platform (40) provides an application framework for integrating network hardware devices into a web-based services architecture in which heterogeneous network hardware devices (31, 32, 33, 34) having varying capabilities (hardware only, software only and combined software/hardware) can be seamlessly controlled and accessed by the client device (30) to provide specific services based on the capabilities of the network devices.

As will be explained in further detail below, the constituent software modules of the web-services platform (40) include various functions that enable hardware devices as web-based services including, but not limited to, (i) providing a standard (SOAP, XML) web-services interface across disparate network devices (ii) identifying different sets of network accessible hardware devices (physical location, type etc), and the capabilities available with each set; (iii) seamlessly setting up direct data connections to and between network hardware devices; (iv) controlling the capabilities of the different hardware devices using standard desktop collaboration tools (such as email client or calendar); and (v) allowing the network hardware devices to seamlessly communicate with and invoke other network devices or web services to execute composite workflows (e.g., for example, log usage of the endpoint for billing or statistics collection).

The API (41) provides a standard web services interface that allows a client to invoke services of network hardware devices and other web services through the web services platform (40). The API (41) may also include methods for advertising, locating, discovering, and registering hardware device services through standard web service interfaces and protocols. The web service controller (42) controls invocation and process flow execution of the web services application logic for accessing services of one or more network hardware devices through the web service adaptor (43) in response to access requests. The services controller (42) comprises logic to drive the service invocation behavior of the platform and control the runtime logic flow for executing single or composite services.

In one exemplary embodiment, the web service adapters (43) are used to build a common interface through which networked physical (hardware) devices from various vendors (which perform functionally similar tasks) can be accessed to provide specific service without the need for installing vendor specific drivers on the client. The device adaptors (43) may comprise one or more vendor specific and/or standards specific web service adaptors (43A, 43B, 43C) that expose a common services interface to a set of heterogeneous network hardware devices having diverse capabilities and interfaces, but which perform a functionally similar task. Essentially, each web service device adapter (43A, 43B, 43C) corresponds to a generic device type (or device class) (e.g., printer) that implements a common function (e.g., printing) and exposes a standard access interface to over different devices that implement the common function.

For instance, in the exemplary embodiment of FIG. 1, the device adaptor (43A) supports a "print" web service for "printer device" class, the device adaptor (43B) provides a "display" web service for "display device" class, and the device adaptor (43C) provides a "video capture" web service for a "camera device" class. Essentially each device adaptor for a given class of hardware device provides a common services interface that enables access and control of heterogeneous hardware devices, which implement a common function but having dissimilar capabilities and interfaces, through a web service that provide function abstraction and capability negotiation. With regard to function abstraction, each device adaptor enable aggregating and controlling a set of heterogeneous hardware devices (e.g., printer) having diverse capabilities and interfaces but perform a functional similar task (e.g., printing). Each deice adaptor provides a common interface to a set of abstract functions that enable standard access to the different capabilities of each device. The adapters provide the necessary functions for communication with and executing commands on associated hardware devices (e.g., providing connections to hardware devices, converting messages between abstract and low level control signals, and providing an abstract set of commands that abstract the hardware's device operating protocol (commands, control signals), i.e., abstract code that implements the device control.

With regard to capability negotiation, when given a particular task (e.g., printing), the web service can determine which device(s) have the capabilities to perform the task. A task may have multiple steps which require orchestration of capabilities, whereby the web service allows one to choose and orchestrate devices with respect to these constraints. Furthermore, device capabilities are subject to negotiation—thus the typical process of service identification by searching a registry may be a two step process in the case of hardware devices: (a) identify a suitable device in the registry and (b) negotiate with the device as to which of its capabilities can be used. The capabilities of the physical devices around the user are exposed using the web-services adapters and the capability negotiation as well as device selection and configuration happens seamlessly without the source having to install separate drivers based on different client requirements.

In one embodiment, a functional discovery mechanism may be used to query the list of web service adapters which match the capabilities required to perform a particular task and select one or more hardware devices on this basis. This is in contrast to a search of WSDL files enabled by repositories such as Universal Description, Discovery, and Integration (UDDI). Firstly, each task may comprise the orchestration of services from multiple hardware devices which may reside in multiple repositories. Secondly, there may be constraints on the use of devices based on the user and the time of the task instantiation. Thirdly, there may be constraints, based on how the devices are used in the task—as an example, a task involving using a fax machine and a copier machine, may require the use of the copier while the fax is ongoing—thus, one combo box which can both fax and copy data may not be able to perform the task, although it may be able to satisfy the requirements placed on individual service elements needed to orchestrate the task. In another embodiment, we envisage the use of user specific profiles—as an example, one person who uses multiple offices and multiple computers might want to use the same configurations for the printers, audio and video conferencing equipment, fax machine etc.—thus, a user profile which is not part of either the client device, nor the web service adapter which can track and manage these profiles would be of use.

Web service device adaptors enable hardware devices to be accessed/controlled to perform a task in a specified fashion either immediately or be configured to perform such task at a later time. Using the web-services adapters, capabilities of physical devices to be published in a searchable directory (that may be accessed using well established protocols) and allow the physical devices to be compostable into workflows and complex aggregate business services. For example several different components, including physical devices from multiple vendors, and different software services, may be composed together to achieve complex aggregate services inside enterprises. Moreover, hardware devices can behave as services playing a part in these aggregate services as individual components. In particular, a device can actively participate in a business process work flow, i.e., devices can not only be invoked through service interfaces but also invoke other services as part of the work flow. For example, hardware devices may invoke web services programs (44) which provide supporting ancillary service access that may be common to or requested by multiple web services. The supporting web services may be services such as billing, authentication, and other types of services that may support or relate to access or controlling hardware device services. In the context of the proposed invention, a hardware device's capabilities are not only exposed as web services, but the device would also play an active role in composable workflows involving web services—thus services are not just leaf nodes in a work flow but they actively participate and invoke other services.

Figure 2:
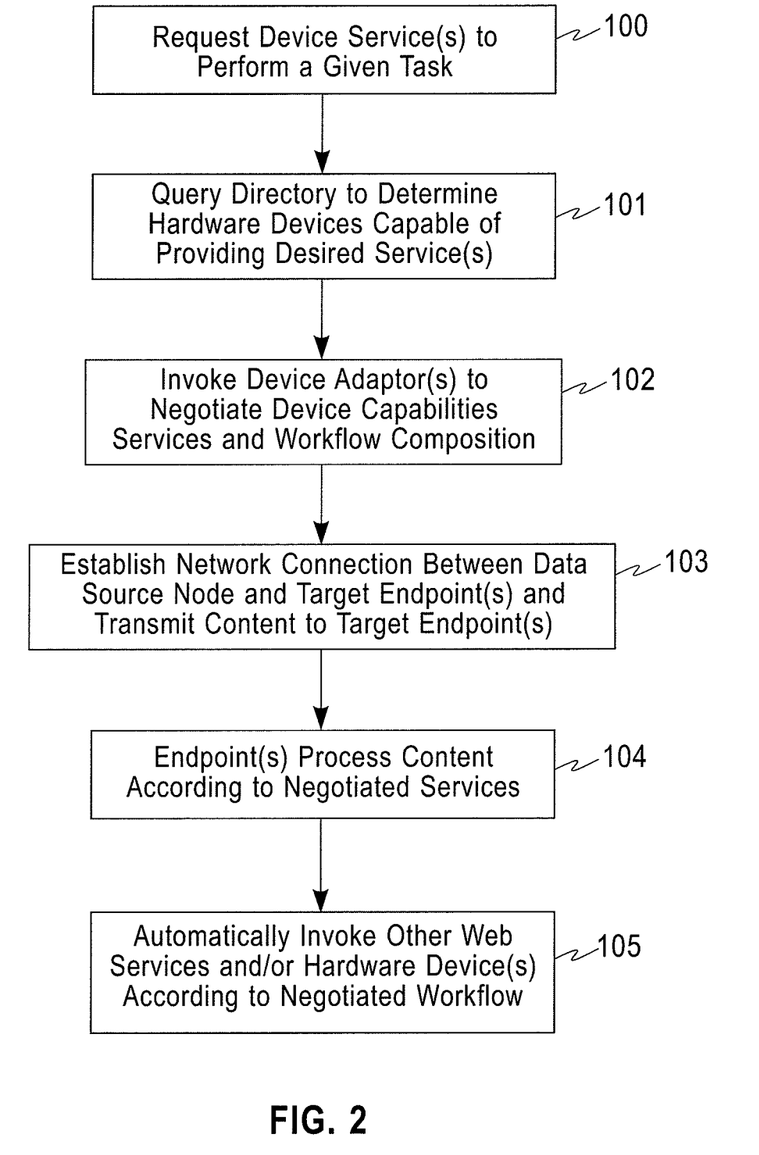
FIG. 2 is a flow diagram of a method for accessing and controlling networked hardware devices as web services according to an exemplary embodiment of the invention.

FIG. 2 is a flow diagram of a method for accessing and controlling networked hardware devices through a web-based services interface according to an exemplary embodiment of the invention. In particular, FIG. 2 illustrates a general process flow for invoking services of hardware devices and incorporating the invoked services into workflows along with other web services using standard web-services interfaces. For purposes of illustration, the exemplary process of FIG. 2 may be discussed in relation to the exemplary computing system of FIG. 1, wherein it is assumed that an application (e.g., the client application (30) or application server (34)) invokes the services of one or more network accessible hardware devices (31, 32, 33) through the web services platform (40) to perform a given task (e.g., print a document, display video content, distribute content to a plurality of clients at different locations over the network (20) (step 100). Upon receiving a service request, the services platform (40) proceeds to identify (e.g., determine location, type, etc.) one or more physical devices (printers, displays, etc.) in the geographical vicinity of the user that are capable and available to be accessed (step 101) to perform the requested services. For example, the services platform may access a service directory (e.g., UDDI directory 51 in FIG. 1) to query a list of web service device adapters to determine those adaptors that provide service capabilities required to perform the requested service and then select one or more hardware devices based on their capabilities and availability. In another exemplary embodiment, the hardware devices may be identified based on a user profile that lists capabilities of one or more hardware devices, wherein the user profile is stored on a device separate from either the hardware device providing the capabilities or the client device requesting the services. As an example, a person who uses multiple offices and multiple computers may want to utilize the same configurations for the printers, audio and video conferencing equipment, fax machine etc. A user profile which is not part of either the client device, nor the web service adapter can be used to track and manage these profiles.

After identifying the hardware device(s) that match the capabilities required to perform the particular task, the web services platform (40) will communicate with the available hardware devices through the corresponding web service device adaptors to negotiate with the hardwares devices as to which of capabilities are available for performing the requested service (step 102) The capability negotiation for services from physical devices can be for an atomic service or a composite surface including composition of different hardware device services and software services into a given workflow that is seamlessly controlled and executed using the web services interface. For example several different components, including physical devices from multiple vendors, and different software services, may be composed together to achieve complex aggregate services inside enterprises, wherein physical (hardware) devices behave as services playing a part in aggregate services as individual components.

The web service adaptor will access and configure one or more physical devices based on the client request and results of capability and service negotiation and establish the appropriated network communication channels (step 103) and the client source with send the content to the appropriate end points (step 104) On completion, the hardware device can invoke other web services and/or hardware devices in accordance with a negotiated workflow process (step 15). With the exemplary process, all the capability negotiation for the physical devices and software services and composition into the workflow is performed using standard web-services interfaces. The physical devices can provide services invoked using standard web-services interfaces, and furthermore the devices themselves actively invoke other services to complete the workflow. This is in direct contrast to the typical use of web service adapters as a means for allowing data exchange between disparate software programs.

Figure 3:
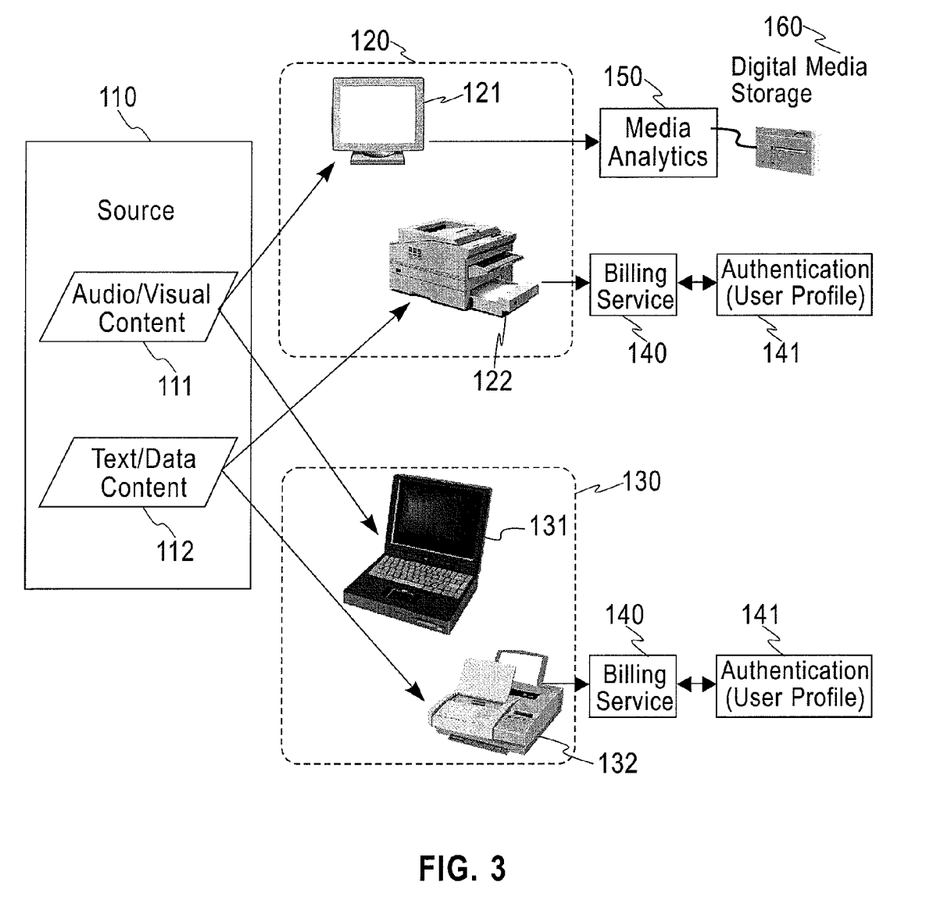
FIG. 3 schematically depicts a specific example of the process flow of FIG. 2, wherein hardware devices are invoked and incorporated as part of a composable workflow process for an in-service training seminar in which seminar material is distributed over a shared communications network to various users at different locations, according to an exemplary embodiment of the invention.

FIG. 3 schematically depicts a specific example of the process flow of FIG. 2, wherein hardware devices are invoked and incorporated as part of a composable workflow process for an in-service training seminar in which seminar material is distributed over a shared communications network to various users at different locations. Consider an example of an in-service training seminar, where the material consists of the speaker video as well as additional materials such as slides and handouts. In FIG. 3, a data source (110) includes audio/video content (111) (e.g., speaker video) as well as data (112) (slides and handouts) that are to be distributed to various participants or users at different locations (120) and (130) over a network. The hardware devices at one location (120) include a network display (121) and network printer (122) and the hardware devices at the other location (130) include a laptop (131) and network printer (132). The source (110) may query a UDDI directory to identify the available hardware resources at each of the locations (120) and (130) based on user profiles and then negotiate the capabilities of the display devices (121) and (131) for rendering the audio visual content (111) and the printer devices to print the textual content (112). The networked display (121) can invoke a media analytics service (150) (software service) that can then store the results in a networked digital media store (160). The physical devices (122) and (123) may also invoke other web-services, such as a billing service (140) to compute an invoice based on the device capabilities, service rendered, and user profile (141).

The above exemplary embodiments discussed with reference to FIGS. 1 and 2 are high-level conceptual system frameworks and methods for providing web services based on capabilities of physical devices. It is to be appreciated that inventive concepts can be implemented in various application environments and distributed computing systems. For instance, exemplary embodiments of the invention will now be discussed with reference to implementation of web services framework for accessing and controlling hardware devices in the context of a video conferencing applications. Conventional video conferencing systems are built around the H.323 (LAN)/H.320 (ISDN) standards and have followed a separate development path from the traditional IT infrastructure. As the number and capabilities of desktop collaboration tools have increased, there has been increased pressure on the video conferencing vendors to develop solutions that span both the PC and traditional hardware based video conferencing infrastructure. This leads to the presence, in one video conference, of several hardware and software end-points with varied sets of capabilities.

Figure 4:
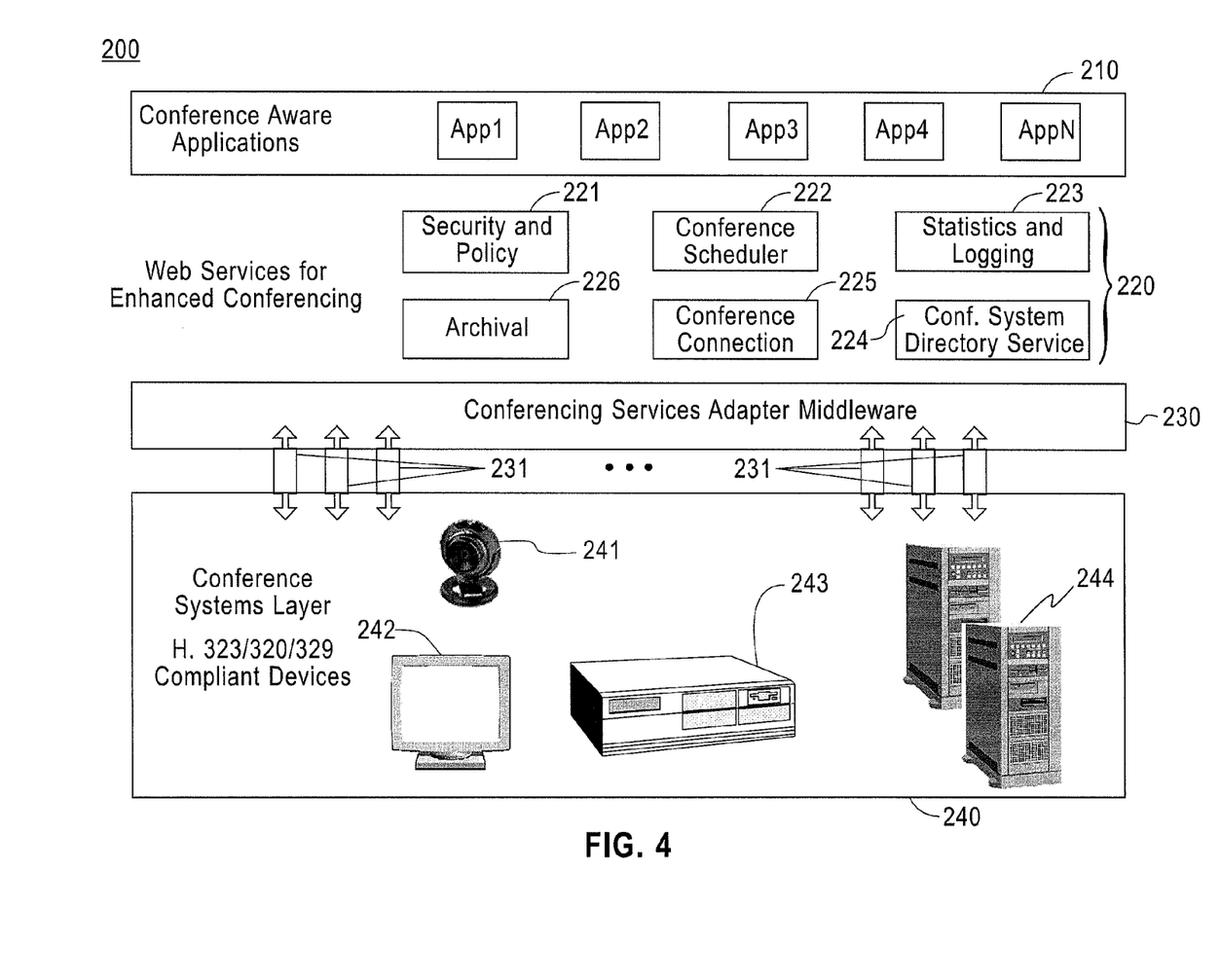
FIG. 4 is a block diagram of a distributed video conferencing system in which networked hardware devices are controlled and accessed as web services according to an exemplary embodiment of the invention.

FIG. 4 is a block diagram of a distributed computing system (200) in which networked hardware devices are controlled and accessed as web services according to an exemplary embodiment of the invention. In particular, FIG. 4 is a high-level conceptual diagram of various layers of a video conferencing system architecture that implements ser-services interface to invoke services of physical devices used in videoconferences. The computing system (200) comprises conference aware applications (210), web service layer (220), conference services adapter middleware layer (230) and conference systems layer (240). The conference aware application layer (210) includes client software tools that are capable of accessing the web services layer (220) to schedule videoconferences. The web services layer (220) provides a runtime web services platform providing common conferencing services (221~226) to support the overall videoconferencing solution. As explained below, these services (221~226) support the scheduling of a video conference.

The conference systems layer (240) is essentially a physical device layer comprising various end point hardware devices including a camera (241) and network display (242) that transmits or receive data in a videoconference. An MCU (Multipoint Control Unit) (243) serves as the "conference room" for a multipoint conference and controls where each data stream (audio, video, etc.) is sent, and allows more than two users to communicate simultaneously. A Gateway/Call Manager (244) component in an H.323 conference "translates" between different audio and video codecs or different protocols. This may allow a user with an ordinary phone (working over the POTS, or Plain Old Telephone Service) to participate in an H.323 conference.

IN the context of the videoconference application, the conferencing web-services adapter middleware (230) is adapted to (i) provide a standard (SOAP, XML) web-services interface for these devices (ii) identify the different sets of endpoints (their physical location, their type etc), and the capabilities available with each set (e.g., for instance, the hardware endpoint comes with additional capability to serve as a multi-point conferencing unit (MCU) that can mix video from several sources into a common stream for the endpoints (iii) provides a mechanism to setup a direct data connection between these different endpoints having varied capabilities enabling the video conference (iv) provides a mechanism to control the capabilities of the different devices (e.g., allow the scheduling of video conferences using other standard desktop collaboration tools (such as email client or calendar); (v) allows the devices to communicate with other devices or services to execute workflows (e.g., for example, log usage of the endpoint for billing or statistics collection).

The web services platform (220) comprises one or more software services that may be accessed via a web services interface and incorporated as part of a workflow for accessing one or more end points and controlling/scheduling videoconferences. The security and policy enforcement service (221) enables a client application to gain controlled access to video conferencing resources, e.g., access privileges, enforcement of policies to allow prioritized allocation of resources (such as MCUs). The conference scheduler service (222) provides the ability to reserve conferencing resources by maintaining a registry. Back end database enables the scheduler to maintain transactional consistency in allocating resources. The statistics and logging service (223) operates to log conferencing resources usage and monitor the activities of individual users. This service may be used by applications such as billing and usage policy enforcement. The archival service (226) operates to establish a connection with an ongoing video conference and record the data in a standard compliant format. Applications may use this service to generate an archive of a particular video conference. The conference connection service (225) operates to connect conference end-points in a conference provide the ability to query the health of an ongoing conference. Applications can use this service to establish the connection and monitor its health during the conference. The conferencing system directory service (224) operates to maintain a list of conferencing end-points. The service (224)

may correlate the list of conferencing end-point addresses with a corporate LDAP, so that a single corporate wide user id can be maintained.

These services require coordination between hardware and software components. By using a web-services architecture, multi vendor, multi-modality (software, hardware or a combination thereof) conferences can be scheduled "on the fly" to control hardware devices incorporating various capabilities H.323/H.320H.239,etc.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

We claim:

1. A computing system, comprising:
 a network comprising a plurality of network nodes including one or more device nodes and computer nodes;
 a network hardware device located at each device node over the network;
 a web services platform hosted by one or more computer nodes over the network, which provides access and control of the hardware devices over the network through a common, device-independent interface exposing capabilities of the network hardware devices as web services that can be invoked to perform a service; and
 a web service device adaptor performing as the common, device-independent interface to expose the capabilities of only a specific class of network devices having a common functionality, wherein the specific class of network devices is a printer device class, a display device class or a video capture class,
 wherein control of two or more of the network hardware devices of the specific class of network devices is aggregated by the web service device adaptor through the common, device-independent interface.

2. The computing system of claim 1, further comprising at least another web service adaptor performing as another common, device-independent interface exposing the capabilities of another class of network devices based on another common functionality.

3. The computing system of claim 2, wherein each web service device adaptor exposes a common interface to a set of heterogeneous network hardware devices which perform a same common function, but which have diverse capabilities and interfaces associated with the common function.

4. The computing system of claim 3, wherein each web service device adaptor enables aggregating and controlling network devices within the corresponding device class to perform a given task as well as negotiating capabilities of the network devices within the device class to perform the given task.

5. The computing system of claim 1, further comprising one or more network directory nodes in communication the web services platform and having published network device web services and software web based services corresponding to the capabilities of the hardware devices and the network hardware devices, respectively.

6. The computing system of claim 1, wherein the capabilities of the network hardware devices can be invoked as part of a composite web service workflow incorporating control of the network devices.

7. The computing system of claim 1, wherein the web services platform uses each common, device-independent interface to access and control a set of heterogeneous hardware devices that are associated with a class of network devices having a varied set of capabilities and interfaces but which perform a similar common function.

8. The computing system of claim 7, wherein in response to a client request for a given service, the web services platform uses the common device-independent interfaces to seamlessly identify one or more available network devices that support one or more capabilities needed to perform the requested service, and control the one or more identified network devices to perform the requested service.

9. The computing system of claim 8, wherein the web services platform uses the common device-independent interfaces to seamlessly negotiate available capabilities of one or more of the identified network devices to perform the requested service and select one or more of the identified network devices having available capabilities to perform the client requested service.

10. The computing system of claim 8, wherein in response to the client request, the web services platform can establish a direct network connection between the requesting client and one or more of the identified network hardware devices.

11. The computing system of claim 1, wherein in response to a user request for a given service, the web services platform accesses one or more user profiles that list one or more capabilities of one or more target hardware devices to thereby identify and access the one or more target hardware devices to perform the requested service.

12. The computing system of claim 11, wherein the one or more user profiles are stored on a device separate from either the network hardware device providing the service or the client device used to access these capabilities.

13. A system to provide uniform access to hardware devices on a network through Web Services, the system comprising one or more computer nodes hosting a web services platform on the network, wherein the web services platform provides access and control of the hardware devices over the network through one or more web service device adaptors, wherein each web service device adaptor provides a device-independent interface that exposes capabilities of a plurality of network hardware devices belonging to a respective common class of network devices, the network devices of each common class performing a same common function and having diverse capabilities and interfaces associated with the common function, the common classes including a printer device class, a display device class and a video capture class,
 wherein a corresponding one of the one or more web service device adaptors aggregates and controls the plurality of hardware devices of the common class of network devices, and
 wherein each class of network devices corresponds to a different specific web service device adaptor.

14. The system of claim 13, wherein each web service device adaptor enables aggregating and controlling network devices within the corresponding device class to perform a given task as well as negotiating capabilities of the network devices within the device class to perform the given task.

15. The system of claim 13, further comprising one or more network directory nodes in communication the web services platform and having published network device web services and software web based services corresponding to the capabilities of the hardware devices and the network hardware devices, respectively.

16. The computing system of claim 13, wherein the capabilities of the network hardware devices can be invoked as part of a composite web service workflow incorporating control of the network devices.

17. The system of claim 13, wherein in response to a client request for a given service, the web services platform uses the web services device adaptors to seamlessly identify one or more available network devices that support one or more capabilities needed to perform the requested service, and control the one or more identified network devices to perform the requested service.

18. The system of claim 17, wherein the web services platform uses the web services device adaptors to seamlessly negotiate available capabilities of one or more of the identified network devices to perform the requested service and select one or more of the identified network devices having available capabilities to perform the client requested service.

19. The system of claim 17, wherein in response to the client request, the web services platform can establish a direct network connection between the requesting client and one or more of the identified network hardware devices.

* * * * *